Oct. 16, 1951  O. E. FISHBURN  2,571,434
POWER TRANSMISSION
Filed March 18, 1946  3 Sheets-Sheet 1
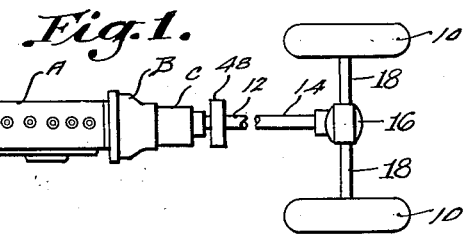
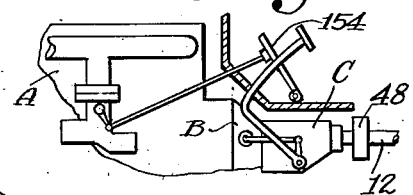
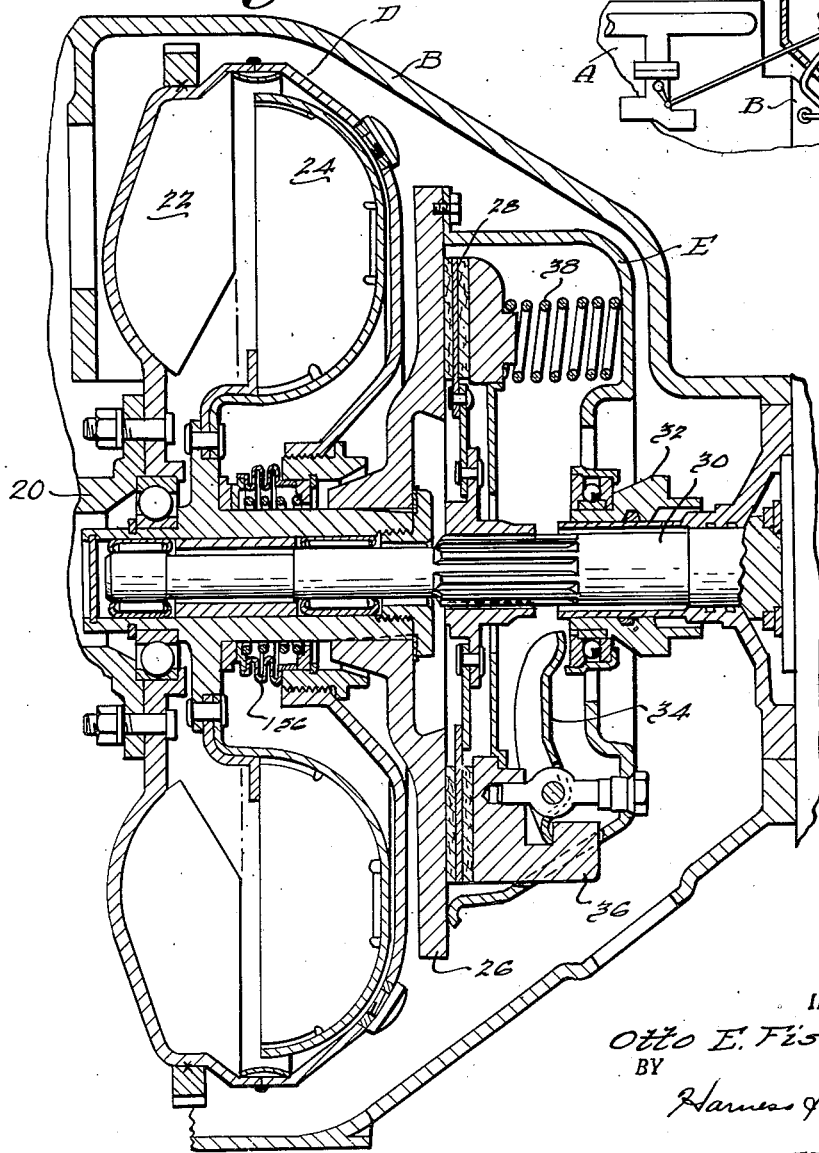
INVENTOR.
Otto E. Fishburn.
BY
Harness & Harris
ATTORNEYS.

Oct. 16, 1951     O. E. FISHBURN     2,571,434
POWER TRANSMISSION
Filed March 18, 1946                             3 Sheets-Sheet 2
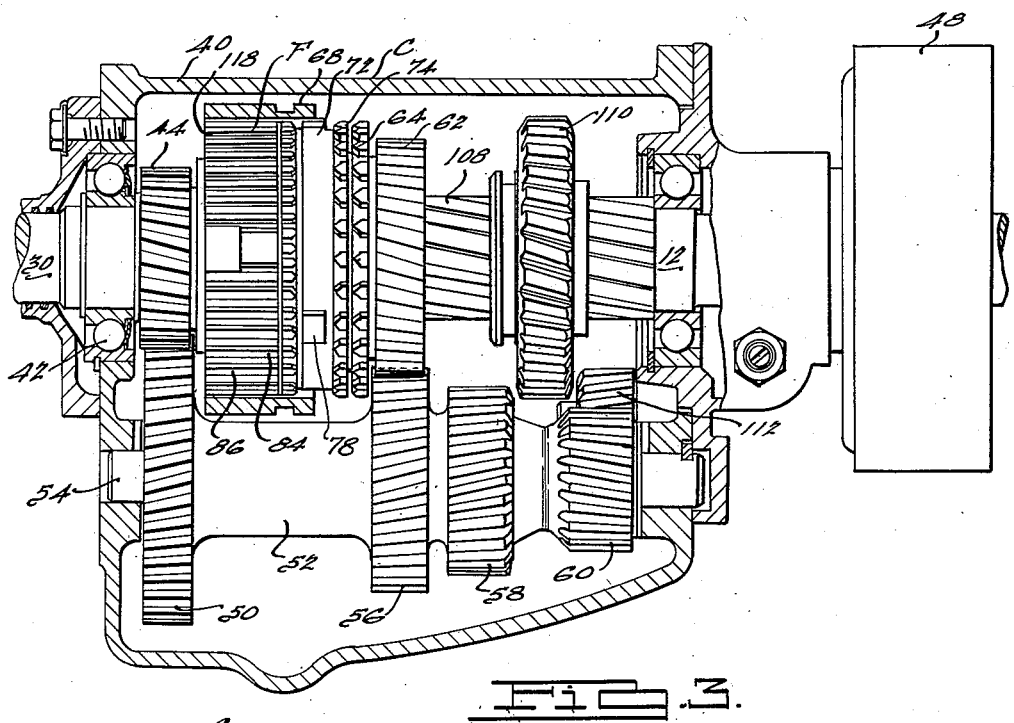
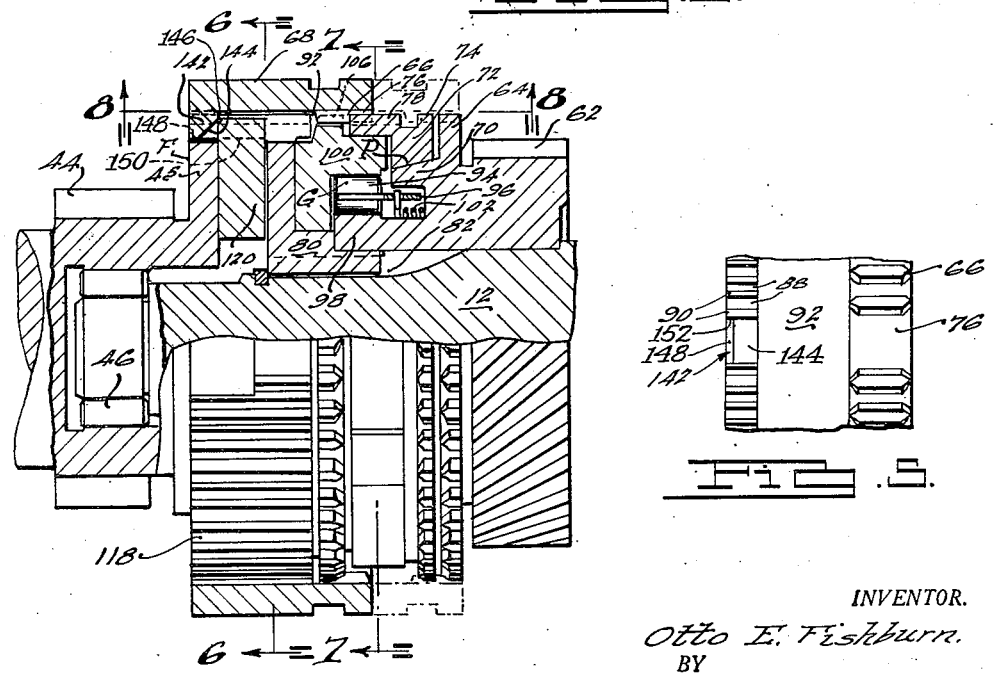
INVENTOR.
Otto E. Fishburn.
BY
Harness & Harris
ATTORNEYS.

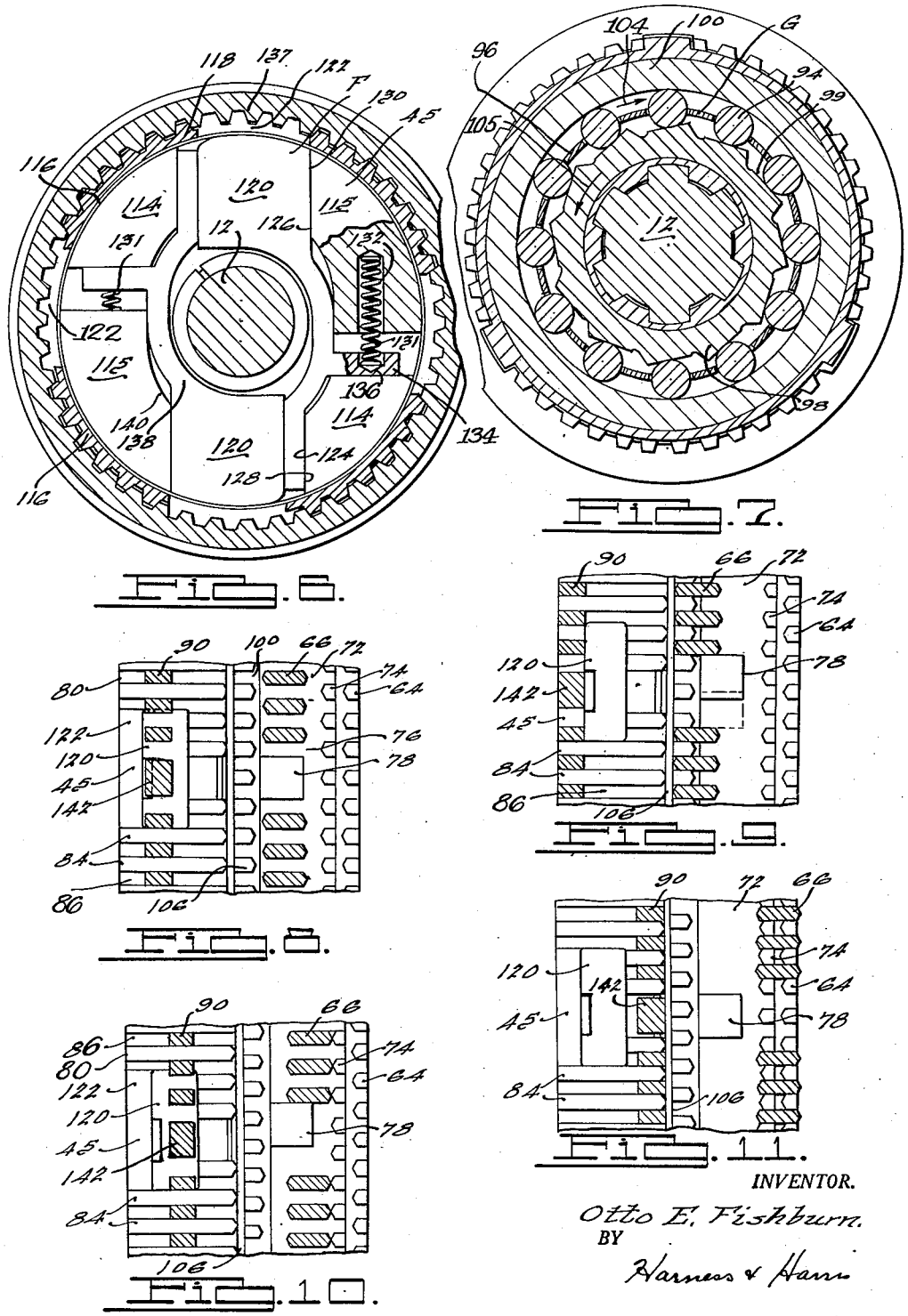

Patented Oct. 16, 1951

2,571,434

UNITED STATES PATENT OFFICE 2,571,434

POWER TRANSMISSION

Otto E. Fishburn, Detroit, Mich., assignor to Chrysler Corporation, Highland Park, Mich., a corporation of Delaware Application March 18, 1946, Serial No. 655,193

24 Claims. (Cl. 74—336)

1

This invention relates to power transmission, and particularly to improvements in automatic transmissions of the solely manually selective type providing, for instance, three forward speeds and reverse.

One of the disadvantages of transmissions of the aforesaid type is the need for de-clutching and making several selective gear changes in order to get into a cruising speed ratio drive from starting. To overcome this disadvantage, automatic shifting has been provided in many cars but such has been limited to the higher price lines and has necessitated substantial mechanical and electrical controls. The present invention contemplates a low cost wholly mechanical arrangement free of complicated controls providing in low price cars an automatic speed ratio upshift under driver control. In its broad aspect the invention incorporates in a manually selective transmission a centrifugal pawl clutch and a fluid coupling, these being arranged such that the pawl carrying member is resiliently driven by the runner of the fluid coupling so as to absorb any shock in engagement of the pawl with the pawl receiving member and render negligible any "clunk" upon engagement.

In the described arrangement, the pawls are controlled to be conditioned for engagement at a runner speed which represents substantially zero slip in the coupling and may be engaged upon coast of the impeller to below the runner speed by throttle closing movement of the accelerator. This specific control is advantageous in that release of the pawls in slowing down the vehicle is accomplished with the coupling at substantially zero slip when minimum drag torque holds the pawls engaged. The invention further includes means for positive release of the pawls at driver option.

An object of the present invention is to provide an improved transmission incorporating a driver controlled automatic mechanical upshift between second and high speed.

Another object is to provide a simple inexpensive three-speed forward and reverse transmission for low price cars and which has at least one automatic speed change.

A further object is to provide a transmission of the aforesaid type including a two-way drive in each ratio.

A more specific object is to provide a transmission combining therein a fluid coupling and a centrifugal pawl clutch whose engagement is under control of the former at substantial zero slip of the coupling.

2

These and other objects and features of my invention will become apparent from the following description when taken in conjunction with the accompanying drawings wherein:

Fig. 1 is a diagrammatic showing of the power plant and drive mechanism of a vehicle incorporating the present invention;

Fig. 1ᵃ is a side elevational diagrammatic view showing the throttle mechanism.

Fig. 2 is an enlarged cross sectional view of a portion of the Fig. 1 mechanism;

Fig. 3 is a sectional elevational view through the speed ratio changing transmission of my invention and which connects with the mechanism of Fig. 2;

Fig. 4 is a detailed enlarged view of the second-direct speed selector mechanism of my invention, the shift sleeve being shown in freewheel second position with the centrifugal clutch engaged to establish direct drive;

Fig. 5 is a fragmentary view of an interior portion of the shift sleeve of the Fig. 4 mechanism showing the pawl release cam and clocking slot;

Fig. 6 is a sectional view taken at 6—6 of Fig. 4 showing the centrifugal pawl mechanism with the pawls disengaged;

Fig. 7 is a sectional view taken at 7—7 of Fig. 4 showing the free wheel clutch mechanism;

Fig. 8 is a sectional plan view illustrated as a development according to line 8—8 of Fig. 4, the clutch sleeve being in neutral position;

Fig. 9 is a similar view showing the clutch sleeve in freewheel second position and direct drive position;

Fig. 10 is a similar view showing the clutch sleeve in coast blocking position when making a shift from direct drive position to two-way second speed ratio position; and Fig. 11 is a similar view showing the clutch sleeve engaged in two-way second.

Referring now to the drawings wherein similar reference characters are used to designate corresponding parts of the structure, Fig. 1 illustrates a typical arrangement of transmission mechanism in a vehicle embodying the present invention. The vehicle engine A is coupled to the driving wheels 10 of the vehicle through a fluid power transmitting and clutch unit B shown in more particular in Fig. 2 and a change speed gearing C shown in detail in Figs. 3-11 inclusive and comprising a three speed forward and reverse transmission having an automatically operative direct drive ratio. As seen in Fig. 1, the output shaft 12 of the unit C is connected by means of the usual propeller shaft 14 with customary differential gear box 16 which in turn drives the axle shafts 18. A 3.9 axle ratio is preferred.

As best seen in Fig. 2, I preferably arrange for transmitting drive from the engine A to the transmission C through clutch means comprising a fluid coupling D of the kinetic type preferably in conjunction with a releasable master clutch E of a conventional design primarily employed to facilitate manual shift in the transmission C.

The engine crankshaft 20 drives the coupling impeller 22 to circulate fluid in its vaned passages to drive the vaned runner 24 in a manner well known for fluid couplings of the type illustrated. The runner 24 drives the clutch member 26 of the friction clutch E of commercial design. Driven clutch member 28 is fixed to intermediate shaft 30 and is drivingly disengaged by depressing a clutch pedal (not shown) which slides throw-out sleeve 32 forwardly to operate levers 34 to unload driving pressure plate 36, springs 38 loading this plate and engaging the clutch when the clutch pedal is released.

Shaft 30 extends rearwardly into the housing or casing 40 of transmission C (Fig. 3) where it is rotatably supported by a ball bearing 42 and is formed with a main drive pinion 44 at its inner end. Also formed on the inner end of the shaft 30 is an enlargement 45 constituting the pawl carrier of a centrifugal clutch F more clearly illustrated in Fig. 6. The drive pinion 44 is hollow and journals by a bearing 46 (see Fig. 4) the forward end of the transmission driven shaft 12 which may also carry at its opposite end a propeller shaft brake drum 48, having braking mechanism (not shown) associated therewith.

The drive pinion 44 continuously meshes with a gear 50 for driving the countershaft cluster 52, carried for rotation on a countershaft 54 supported in the casing 40. The cluster 52 includes a second or intermediate speed pinion 56, a first or low speed pinion 58 and a reverse pinion 60.

The second speed pinion constantly meshes with a second speed gear 62 journaled for rotation on driven shaft 12. The gear has a set of integral external clutch teeth 64 adapted for engagement by internal clutch teeth 66 (see Fig. 5) carried by a manually shiftable sleeve 68. The gear member 62 is also provided with a cone-shaped surface P, on which is rotatably carried a synchronizing and blocker element or ring 72, having clutch blocker teeth 74. It will be noted that the teeth 64 and 74 are pointed on their forward ends to facilitate blocking and shifting, and the teeth are equally angled at each side. The teeth 66 of the sleeve 68 are similarly pointed at both ends for the same reasons. A clocking slot 76 (see Figs. 4 and 5) formed on the sleeve 68 for instance by cutting out one of the internal clutch teeth 66 receives a radially projecting lug 78 of the blocker 72 and permits the latter to oscillate within the limits of the slot 76 to provide relative rotation with the sleeve 68 for blocking purposes. Combined synchronizing and blocker mechanisms of this general type are well known in the art and hence, except as hereafter made reference to, this description is deemed sufficient. A plurality of clocking lugs and slots may be provided. In the instant disclosure three are shown.

The shift sleeve 68 is slidably carried on a hub 80 member splined to the shaft 12 at 82, and which member constitutes the female or driven portion of the centrifugal clutch F. The hub has external splines or teeth 84, and splineways 86 to receive respectively the mating internal splineways 88 and splines 90 of the sleeve 68. The teeth 90 are preferably of the same form as the clutch teeth 66 and axially in line therewith. The teeth 90 and 66 are furthermore separated axially by a groove or space 92 for reasons hereinafter explained.

An overrunning clutch generally designated by the letter G (Fig. 4) is arranged intermediate the gear member 62 and sleeve 68 and hub 80 elements to provide a one-way driving connection between the gear 62 and hub through the sleeve being adapted to drivingly lock the gear 62 and sleeve 68 together upon tendency of the gear 62 to rotate faster than the sleeve 68 in a forward direction while permitting overrun of the sleeve 68 relative to the gear 62. The clutch is of the conventional type and is provided with rollers 94 and a cage or carrier 96 having tabs (not shown) receivable into slots (not shown) in the forward portion 98 of the gear 62 to establish a lost motion driving connection with the gear 62. The portion 98 is provided with cam faces 99 (see Fig. 7) forming the inner race of the device and an outer race or shell 100 journaled on the hub 80 surrounds the rollers 94 and provides a smooth runway therefor. A torsion spring 102 biases the rollers in the direction of the arrow 104 in Fig. 7 into lock-up position and lock-up occurs whenever the gear 62 tends to rotate forwardly in the direction of the arrow 105 in Fig. 7 faster than the sleeve 68. The outer race is provided with external clutch teeth 106 engageable with the clutch teeth 66 of the sleeve 68 to provide a driving connection between these two elements so that when the freewheel device G is in lockup drive may be transmitted from the gear 62 to sleeve 68 and thence through the hub 80 to the driven shaft 12. The rearward ends of the teeth 106 are pointed in a manner similar to the teeth 64, to facilitate engagement between the teeth of the sleeves and those of the shell when disengaging the sleeve 68 from engagement with the clutch teeth 64 as hereinafter mentioned.

The sleeve 68 is adapted for shifting forwardly of a neutral position to engage the clutch teeth 106 of the freewheel device G with the sleeve clutch teeth 66 and thereby establish freewheel second drive ratio of approximately 1.55:1 between the input shaft 30 and the driven shaft 12 through the means consisting of elements 30, 44, 50, 56, 62, G, 106, 66, 68, 90, 84, 80, 12. Figures 3 and 9 show the sleeve teeth in this position.

The sleeve 68 is also adapted for shifting rearwardly of a neutral position to engage the clutch teeth 66 of the sleeve with the clutch teeth 64 on the gear 62 to thereby establish non-freewheel second drive ratio, which is a two-way drive, through the means consisting of elements 30, 44, 50, 56, 62, 64, 66, 68, 90, 84, 80, 12. This position of the sleeve is shown in Fig. 11. In shifting the sleeve 68 to establish this drive the clutch teeth 66 of the sleeve 68 are first disengaged from the teeth 106 of the freewheel device G and then engaged with the clutch teeth 64 after passing between the blocker teeth 74. When established in non-freewheel second clutch teeth 106 are disengaged from both sets of teeth 66 and 90. This prevents drive of the sleeve 68 through the freewheel device.

In the neutral position of the sleeve 68, see Fig. 8, the clutch teeth 66 are disengaged from both clutch teeth 106 and clutch teeth 64. In all positions the teeth 90 of the sleeve are engaged with the splines 84 of the hub 80.

The sleeve 68 is adapted to be shifted into the various positions by a shift yoke and rail mechanism under control of the driver, suitable stops or detents being provided to properly locate the sleeve.

Rearwardly of the gear 62 the shaft 12 is provided with a spiral splined portion 108 on which is slidable a low-reverse gear 110, this member being shown in its neutral position in Fig. 3. This gear may be shifted forwardly or rearwardly of its neutral position by suitable yoke and rail mechanism (not shown) under driver control. When shifted forwardly the gear 110 becomes engaged with low speed pinion 58 to establish the low or first speed drive ratio of approximately 2.57:1 between the shafts 30 and 12, the drive transmission consisting of elements 30, 44, 50, 58, 110, 108, 12. When shifted rearwardly the gear 110 becomes engaged with an idler gear 112 that is constantly in mesh with the reverse gear 60, thus establishing reverse drive having a ratio of approximately 3.57:1 between the shafts 30 and 12. It will be understood that when shifting the gear 110 the shift sleeve 68 will be in neutral.

Referring now to the elements of the clutch F which by preference is of the centrifugal pawl type and a form of which is best seen in Fig. 6, the pawl carrier 45 is provided with pawl guides 114, 115 which have arcuate faces 116 fitting within the overhanging shell portion 118 of the hub member 80. Slidably secured to the portions 114, 115 are a pair of radially movable pawls 120 which are adapted for outward movement oppositely to one another to engage slots 122 provided in the overhanging shell 118 of the clutch hub member 80 to establish a two-way direct drive between the shafts 30 and 12, four pawl receiving slots are provided 90 degrees apart. Each of the pawls 120 has a pair of faces 124, 126 in sliding engagement with faces 128, 130 respectively of members 114, 115 as shown in Fig. 6. The pawls are oppositely disposed relative to one another and the opposite faces thereof slidably engage one another. In order to normally urge the pawls inwardly of the pawl cage formed by the portions 114, 115 to the position shown so as to prevent their engagement with the slots 122 below a predetermined speed of rotation of the pawl carrier 45, control or governor compression springs 131 are provided in recesses 132 of the guide portions 115, each spring acting upon the wing piece 134 of a pawl, a recess 136 being provided to receive the same. Adjustment of the engaging speed of the pawls may be made either by replacing the spring with new ones of different force values or by means of adjustment set screws (not shown).

The slots 122 are arranged so that diametrically opposite slots will simultaneously register with the pawls 120 so as to receive the pawls under the conditions hereinafter described.

The pawls 120 are slightly rounded at their outer leading edges 137 to reduce ratcheting during rotation of the carrier 45 at a greater speed than the clutch shell 118, after a speed of rotation has been reached at which the centrifugal force tends to move the pawls outwardly having overcome the resistance of the springs 131. When the pawls move outwardly in their slots 122, such movement is limited by engagement of the yoke portion 138 thereof with the inner surface 140 of the guide portion 115 of the carrier.

Means are further provided for positively disengaging the pawls 120 from engaged position with the shell 118. Thus the clutch sleeve 68 is, for example, provided adjacent its forward end with circumferentially spaced integral cam elements in the form of inwardly projecting teeth 142. In the present arrangement four of these teeth are provided preferably substantially transversely aligned with the sleeve clutch teeth 90 (see Figures 4 and 5). The rear face of the teeth 142 is chamfered at 144 to provide a cam face adapted upon rearward movement of sleeve 68 to engage a chamfered face 146 on the pawls 120 when the latter are engaged in the slots 122 to cam the pawls radially inwardly to disengage them from the slots 122 and release the direct drive. The radially innermost face 148 of the cam teeth 142 is preferably flush with the inner circumferential face 150 of the shell 118 such that the pawls when forcibly disengaged may ride on the face 150 and the cam tooth face 148, these latter forming in effect a continuous surface. The cam teeth 142 are also slightly rounded at the edges 152 (Fig. 5) to facilitate ratcheting of the pawls past the cam teeth.

*Operation*

In describing the operation of the transmission let it be assumed that the shift sleeve 68 and low-reverse gear 110 are both in neutral position, the clutch E engaged and the engine idling at approximately 450 R. P. M. Under these conditions the impeller 22 of the fluid coupling D will rotate at engine speed. There will be very little slip in the coupling at this time due to the drag of the coupling seal 156 between the impeller and runner and the light load imposed on the coupling by the clutch G, pawl carrier 45 and countershaft parts. Hence, the pawl carrier will rotate at a speed slightly under engine speed which is not sufficiently high to effect centrifugal movement of the pawls. In any event the pawl release cams 142 will prevent any engagement at this time, they being directly above the pawls. Moreover, there will be no drive between the gear 62 and sleeve 68 since the clutch teeth 106 of the outer race 100 of the free wheel device G is disconnected from the sleeve and rotating freely relative thereto.

In order to obtain movement of the car, the driver will release the clutch E so as to remove the drag torque on the teeth 66, and simultaneously will shift the clutch sleeve 68 forwardly to the position shown in Figs. 4 and 9 during which movement the sleeve clutch teeth 66 become engaged with the teeth 106 of the freewheel device to drivingly connect the latter with the sleeve 68, and the pawl release cam 142 will have moved clear of the pawls 120. Upon completion of this shifting movement the driver will engage the clutch E and depress the accelerator to speed up the engine and the car will be driven forwardly in freewheeling second drive ratio referred to above, through the gear train comprising shaft 30, pinion 44, gear 50, pinion 56, gear 62, freewheeling device "G," sleeve 68, hub 80, shaft 12. This is the starting drive ratio.

The car will be accelerated in freewheel second speed ratio, the various elements being speeded up as the engine speed is increased and the car gains momentum until the fluid coupling is operating in substantially 1:1 ratio, corresponding to substantially zero slip of the runner 24. This occurs around 550 R. P. M. of the engine. Manifestly, the pawl carrier will rotate at a speed corresponding to that of the runner and at some predetermined speed of these elements, for example, 625 R. P. M. substantially corresponding to a car speed between 16 to 17 M. P. H., the pawls 120 will move radially outwardly to contact the inner surface of the drum or shell 118. The pawls, however, will not immediately engage the slots 122 but will ratchet relative to the slots inasmuch as the pawl carrier is at this time rotating faster than the shell 118. This condition will continue so long as the runner 24 imposes torque on the shaft 30 that exceeds the load on the driven shaft 12. When the driver wishes direct drive speed ratio to be established he merely releases the accelerator 154 to decelerate the engine, whereupon, the runner 24 and pawl carrier 45 will slow down and when the rotative speeds of the carrier and shell 118 cross each other, that is, become synchronized and a pawl 120 is aligned with a slot 122, engagement will occur, but if the two are not in alignment the continued slowing down of the carrier 45 will cause a reversal in the direction of rotation of the shell 118 with respect to the pawls 120 so that when the next slot 122 moves into alignment with a pawl 120 the latter will engage the slot due to the shape of the end of the pawl. Upon depression of the accelerator to again speed up the engine, the transmission of torque will again be resumed and direct drive will be established through the elements comprising shaft 30, pawl carrier 45, pawl 120, shell 118, hub 80 and shaft 12. This is a two-way drive. It will be understood that in making engagement with the slots 122, the pawls 120 will be cushioned by the fluid coupling which will absorb any shock occurring in the engagement and will also reduce to a minimum, vibration and noise.

The pawl clutch F will remain engaged and the vehicle be driven in direct drive until the speed of the pawl carrier 45 falls below a predetermined R. P. M. for instance, approximately 575 R. P. M. corresponding to a car speed of about 14 to 15 M. P. H. in direct drive whereupon the springs 131 will effect a release of the pawls 120 and hence a release of the direct drive. Upon release of the pawls the freewheel unit G will simultaneously and automatically re-establish freewheel second drive through the transmission. It is to be noted that at the engine speed at which the pawls release or begin releasing a substantial no-slip condition prevails in the fluid coupling drive and hence very little, if any, drag torque is imposed upon the pawls 120 to prevent their disengagement. Moreover, the springs 131 are strong enough to overcome any coast torque impressed upon the pawls. In view of this automatic operation it is possible, for example, for the driver to slow down the vehicle in approaching a traffic signal and to obtain a downshift from direct drive to freewheel second drive ratio in the process, all without releasing the clutch E. While standing at the traffic signal, the driver may allow the transmission to remain in freewheel second drive ratio without any creep of the car occurring inasmuch as at this time the engine idle speed is preferably insufficient to develop torque enough to overcome the drag load of the vehicle on the runner of the fluid coupling. When the traffic signal changes, the driver need merely depress the accelerator pedal to accelerate the engine and the vehicle will again move forward in freewheel second drive ratio.

It is sometimes desirable, for instance, when coasting down a hill in direct drive or freewheel second, to obtain engine braking. This may be obtained by the operator releasing the clutch E and shifting the clutch sleeve 68 rearwardly to engage the sleeve clutch teeth 66 with the second speed clutch teeth 64 to establish two-way second speed ratio drive comprising shaft 30, pinion 44, gear 50, pinion 56, gear 62, sleeve 68, hub 80, and shaft 12. In making this downshift, if the pawls be then engaged, the sleeve cam element 142 will initially and positively disengage the pawls 120. The sleeve clutch teeth 66 will next become disengaged from the clutch teeth 106 of the freewheel device G to release the freewheel second drive and will then have the rearward ends of its clutch teeth 66 abut the ends of the blocker teeth 74 of the blocker member 72 which under these conditions has its lug 78 at one end of the clocking slot 76 of the sleeve, the sleeve 68 leading the gear 62 in a forward direction of rotation. The continued pressure applied on the blocker member 72 by the shift sleeve will cause the second speed gear to be synchronized in speed to the driven shaft 12, that is, the second speed gear 62 is speeded up through the synchronizing action until the clutch teeth 64 and 66 are brought into proper relationship relative to each other. When a synchronous condition prevails, the blocker 72, teeth 74 will have had a relative reversal of direction of rotation to permit the clutch teeth 66 to pass between them, and the teeth 66 will thereupon move into engagement with the second speed clutch teeth 64 to establish two-way or non-freewheeling second speed ratio drive. It will be understood that a similar synchronizing operation must be performed in shifting the transmission from freewheeling second drive to non-freewheeling second drive. It will be observed that in the two-way second speed position the sleeve teeth 66 maintain the synchronizing ring 72 in a definite relation through the teeth 64 although the clocking ring 78 is disengaged from its slot 76.

Shift from two-way second drive to freewheeling second drive is obtained by releasing the accelerator pedal to decelerate the engine and obtain a reversal of driving torque on the clutch teeth 64, 66 whereupon a forward shift of the sleeve 68 will disengage these teeth and the clutch teeth 66 will engage the clutch teeth 106 of the freewheel device G which at this time is being driven at the same speed as the sleeve 68 by the second speed gear 62, to establish the freewheel second speed drive.

If high torque multiplication is desired for starting, the shift sleeve 68, is left in neutral position and the low speed gear 110 is shifted forwardly to engage the low speed pinion 58. Thereafter upon depression of the accelerator the vehicle will be driven through the shaft 30, pinion 44, gear 50, pinion 58, gear 110 and shaft 12 in this speed ratio.

Reverse drive is made available by shifting the low speed gear 110 rearwardly to engage the idler gear 112 to thereby establish reverse drive through the shaft 30, pinion 44, gear 50, pinion 60, idler gear 112, gear 110, and shaft 12.

It will be understood that adequate means are provided for locking the shift sleeve 68 in neutral when making any shift of the gear 110 and conversely the gear 110 is locked in neutral when shift is made of the sleeve 68. In addition, it will be seen that during any shift of the gear 110 to establish low speed forward or reverse, the pawls 120 of the centrifugal clutch F will be prevented from engaging by reason of the release cam 142 being at such time directly above the pawls.

From the above description it will be seen that I have provided a novel transmission having an automatic speed upshift and kickdown control free of electrical devices and effecting a low cost simple transmission structure. It will be understood that although the particular arrangement disclosed herein is well adapted for carrying out the objects of my invention, various modifications, changes and substitutions may be made without departing from the spirit thereof. The present invention is, therefore, to be construed to include all such modifications, changes, and substitutions as may come within the scope of my invention as presented by the following claims.

I claim:

1. In a variable speed power transmission; a driving structure; a driven structure; change speed mechanism connectible between said structures including means for driving the driven structure from the driving structure in a relatively fast speed ratio drive and in a relatively slow speed ratio drive; the fast speed driving means comprising a speed controlled centrifugal pawl clutch engageable at or above a predetermined speed upon a reversal of torque through said transmission to establish said fast speed drive; the slow speed ratio driving means comprising a speed reducing gear train and an overrunning device adapted to automatically establish said slow speed drive upon release of said fast speed drive; and a movable drive establishing shift sleeve operable to a position where it establishes said slow speed drive and conditions said clutch for engagement, said sleeve being movable at the will of the driver during operation of the transmission in said fast speed ratio drive to effect a downshift in said transmission and including means operable upon said clutch to release the same during said movement.

2. In a variable speed power transmission; a driving structure; a driven structure; change speed mechanism connectible between said structures including means for driving the driven structure from the driving structure in a relatively fast speed ratio drive and in a relatively slow speed ratio drive; the fast speed ratio driving means comprising a speed controlled centrifugal pawl clutch operably responsive to the rotative speed of said driving structure and engageable at predetermined speed of the latter upon a reversal of driving torque to establish said fast speed drive; the slow speed ratio driving means comprising a countershaft gear train and an overrunning device therein adapted to automatically establish said slow speed drive upon release of said fast speed drive; and a drive establishing shift sleeve operable to a position where it establishes said slow speed drive and conditions said clutch for engagement, said sleeve being also operable during operation of the transmission in said fast speed ratio drive to effect a stepdown in drive in said transmission and as an incident thereto to effect a release of said clutch.

3. In a variable speed power transmission; a driving structure; a driven structure; change speed mechanism connectible between said structures including means for driving the driven structure from the driving structure in a relatively fast speed ratio drive and in a relatively slow speed ratio drive; the fast speed driving means comprising a speed controlled centrifugal pawl clutch including a slotted rotatable element connected to the driven structure and a radially movable pawl adapted to engage the slotted element to establish said fast speed drive; the slow speed ratio driving means comprising an axially shiftable drive establishing element, a speed reducing gear train and an overrunning device adapted to automatically establish said slow speed drive upon release of said fast speed drive; and means associated operatively with said shiftable element and operable at the will of the driver to release said pawl from said slotted element and automatically effect a downshift from said fast to said slow speed ratio drive.

4. In a variable speed power transmission; a driving structure; a driven structure; change speed mechanism connectible between said structures including means for driving the driven structure from the driving structure in a relatively fast speed ratio drive and in a relatively slow speed ratio drive; the fast speed driving means comprising a speed controlled centrifugal pawl clutch including a slotted rotatable element connected to the driven structure and a radially movable pawl adapted to engage the slotted element to establish said fast speed drive; the slow speed ratio driving means comprising an axially shiftable drive establishing element, a speed reducing gear train and an overrunning device adapted to automatically establish said slow speed drive upon release of said fast speed drive; and cam means on said shiftable element operable at the will of the driver to release said pawl from said slotted element and automatically effect a downshift from said fast to said slow speed ratio drive.

5. In a variable speed power transmission; a driving structure; a driven structure; change speed mechanism connectible between said structures including means for driving the driven structure from the driving structure in a relatively fast speed ratio drive and in a relatively slow speed ratio drive; the fast speed driving means comprising a speed controlled centrifugal pawl clutch including a slotted rotatable element and a radially movable pawl adapted to engage the slotted element to establish said fast speed drive; the slow speed ratio driving means comprising an axially shiftable drive establishing element, a speed reducing gear train and an overrunning device adapted to automatically establish said slow speed drive upon release of said fast speed drive; cam means carried by said shiftable element in axial alignment with said pawl and engageable with said pawl upon axial movement of said shiftable element to disengage said pawl from said slotted element to release said fast speed ratio drive; and means operable at the will of the driver for shifting said shiftable element.

6. In a variable speed power transmission for a motor vehicle, the combination comprising; a driving structure; a driven structure for driving the vehicle; a fluid power transmitting device, a master clutch, and a change speed mechanism connected in series between said structures, said fluid device comprising an impeller and a runner and said change speed mechanism including means for driving the driven structure from the driving structure in a relatively fast speed ratio drive and in a relatively slow speed ratio drive; the fast speed driving means comprising a speed controlled centrifugal pawl clutch engageable at or above a predetermined vehicle speed upon a reversal of torque through said transmission to establish the fast speed drive and automatically releasable at a lower vehicle speed than that at which it is engaged and during substantially zero slip between said impeller and runner; the slow speed ratio driving means comprising a speed reducing gear train and an overrunning device adapted to automatically establish said slow speed drive ratio upon release of said fast speed drive.

7. In a variable speed power transmission for a motor vehicle having an engine provided with a throttle valve and a driver operable throttle control, the combination comprising; a driving structure; a driven structure; a fluid coupling, a master clutch, and a change speed mechanism connectible in series between said structures; said coupling including an impeller member and a runner member; said change speed mechanism including means for driving the driven structure from the driving structure in a relatively fast speed ratio drive and in a relatively slow speed ratio drive, said fast speed driving means comprising a speed controlled centrifugal pawl clutch engageable to establish the fast drive at or above a predetermined vehicle speed upon releasing movement of said throttle control to permit coast of said engine and automatically releasable at or below a predetermined lower vehicle speed in slowing down of the vehicle and during substantially zero slip between said impeller and runner; and the slow speed ratio driving means comprising a speed reducing gear train and an overrunning device adapted to automatically establish the slow speed drive upon release of the fast speed drive.

8. In a variable speed power transmission for a motor vehicle having a driving structure, a driven structure, a fluid coupling having a runner and having an impeller drivingly connected with the driving structure, a master clutch having a driven side, and having a driving side connected with the runner of the fluid coupling; the combination with said fluid coupling and master clutch of a change speed mechanism connecting the driven side of the master clutch and the driven structure, and comprising means to drive said driven structure forwardly in a free-wheel underdrive ratio, a non-free-wheel underdrive ratio and direct speed ratio; the said underdrive ratios being numerically of the same value; said underdrive driving means including a speed reducing gear train, a toothed clutch member journalled on said driven structure, a shiftable clutch sleeve co-axial with said clutch member, and a free-wheeling device interposed between said toothed clutch member and clutch sleeve; said direct speed ratio driving means including a centrifugal type pawl clutch engageable at a rotative speed corresponding to a predetermined rotative speed of said runner during coast drive of the latter and operable when engaged to drivingly connect the runner with said clutch sleeve; said clutch sleeve being shiftable from a neutral position to a position in clutching engagement with said toothed clutch member to establish said non-free-wheeling ratio drive and to another position establishing drive through the free-wheeling device to establish said free-wheeling speed ratio drive, the latter positioning of said clutch sleeve simultaneously conditioning said centrifugal clutch for effecting said direct ratio drive; and the said clutch sleeve being shiftable during direct drive of the transmission from its said direct drive ratio establishing position to its position establishing said non-free-wheeling ratio drive incident to release of said main clutch.

9. In a variable speed power transmission for a motor vehicle having a driving structure, a driven structure, a fluid coupling having a runner and having an impeller drivingly connected with the driving structure, a master clutch having a driven side and having a driving side connected with the runner of the fluid coupling; the combination with said fluid coupling and master clutch of a change speed mechanism connecting the driven side of the master clutch and the driven structure and comprising means to drive said driven structure forwardly in a free-wheel underdrive ratio, a non-free-wheel underdrive ratio and direct speed ratio; the said underdrive ratios being numerically of the same value; said underdrive driving means including a speed reducing gear train, a toothed clutched member journalled on said driven structure, a hub member drivingly connected to said driven structure, a clutch sleeve carried by said hub and axially shiftable thereon, and a free-wheeling device between said toothed clutch member and hub and adapted to drivingly connect said clutch member and hub; said direct speed ratio driving means including a centrifugal type pawl clutch having a pawl carrying member directly driven by the driven side of said master clutch and engageable at a rotative speed of said pawl carrying member corresponding to a predetermined rotative speed of said runner and a pawl receiving member non-rotatably connected with said hub, the said centrifugal clutch being adapted to drivingly connect said runner and hub when it and said master clutch are engaged; said clutch sleeve being shiftable from a neutral position to a position in clutching engagement with said toothed clutch member to establish said non-free-wheeling ratio drive and to another position establishing drive through the free-wheeling device to establish said free-wheeling speed ratio drive, the latter positioning of said clutch sleeve simultaneously conditioning said centrifugal clutch for effecting said direct ratio drive; and the said clutch sleeve being shiftable during direct drive of the transmission from its said direct drive ratio establishing position to its position establishing said non-free-wheeling ratio drive incident to release of said main clutch.

10. In a variable speed power transmission for a motor vehicle having a driving structure, a driven structure, a fluid coupling having a runner, and having an impeller drivingly connected with the driving structure, a master clutch having a driven side and having a driving side connected with the runner of the fluid coupling; the combination with said fluid coupling and master clutch of a change speed mechanism connecting the driven side of the master clutch and the driven structure and comprising means to drive said driven structure forwardly in a free-wheel underdrive ratio, a non-free-wheel underdrive ratio and direct speed ratio; the said underdrive ratios being numerically of the same value; said underdrive driving means including a speed reducing gear train, a toothed clutch member journalled on said driven structure, a hub member drivingly connected to said driven structure, a clutch sleeve carried by said hub and axially shiftable thereon, and a free-wheeling device between said toothed clutch member and hub and adapted to drivingly connect said clutch member and hub; said direct speed ratio driving means including a centrifugal type pawl clutch having a pawl carrying member directly driven by the driven side of said master clutch and engageable at a rotative speed of said pawl carrying member corresponding to a predetermined rotative speed of said runner and a pawl receiving member non-rotatably connected with said hub, the said centrifugal clutch being adapted to drivingly connect said runner and hub when it and said master clutch are engaged; said clutch sleeve being shiftable from a neutral position to a position in clutching engagement with said toothed clutch member to establish said non-free-wheeling ratio drive and to another position establishing drive through the free-wheeling device to establish said free-wheeling speed ratio drive, the latter positioning of said clutch sleeve simultaneously conditioning said centrifugal clutch for effecting said direct ratio drive; the said clutch sleeve being shiftable during direct drive of the transmission from its said direct drive ratio establishing position to its position establishing said non-free-wheeling ratio drive incident to release of said main clutch; and there being means associated with said clutch sleeve for disengaging said centrifugal clutch in making said shift to establish non-free-wheeling ratio drive.

11. In a variable speed power transmission, a driving pinion, a driven shaft, a clutch associated with said pinion and shaft and adapted when engaged to establish a two-way direct driving connection therebetween, a speed reducing gear train driven by said pinion for driving said driven shaft in a slower speed ratio drive than said clutch, an overrunning device co-axial with said driven shaft and intermediate said shaft and gear train adapted to permit said shaft to overrun said gear train when said clutch is engaged, said clutch including means carried by said driving pinion and responsive to predetermined speed of said pinion for effecting said two-way drive connection, and means operatively associated with said speed reducing train for breaking said two-way connection at the will of the driver.

12. A motor vehicle transmission comprising in combination a drive shaft, a driven shaft, a change speed mechanism connectible intermediate said shafts, said change speed mechanism including a centrifugal pawl clutch comprising a rotatable pawl carrying clutch element rotatable in timed relation with said drive shaft, a radially movable pawl on said pawl carrying element, a rotatable cooperating slotted clutch element rotatable in timed relation to the driven shaft and a drive disconnecting element surrounding said slotted element and operable upon said pawl, the said pawl being engageable with said slotted element at predetermined speed of said pawl carrying element and upon synchronous conditions obtaining between said pawl and said slotted clutch element to establish said drive and driven shafts in direct drive, and said drive disconnecting element being operable at the will of the operator to disengage said pawl to release said direct drive.

13. A motor vehicle transmission comprising in combination a drive shaft, a driven shaft, a change speed mechanism connectible intermediate said shafts, said change speed mechanism including a centrifugal pawl clutch comprising a rotatable pawl carrying clutch element rotatable in timed relation with said drive shaft, a radially movable pawl on said pawl carrying element, a rotatable cooperating slotted clutch element rotatable in timed relation to the driven shaft and a drive disconnecting element, the said pawl being engageable with said slotted element at predetermined speed of said pawl carrying element and upon synchronous conditions obtaining between said pawl and said slotted clutch element to establish said drive and driven shafts in direct drive, and said drive disconnecting element being operable at the will of the operator to disengage the pawl from said slotted element.

14. In a variable speed power transmission; a drive pinion; countershaft gears driven by said pinion including a slow speed pinion; a driven shaft; a gear journalled on said driven shaft in constant mesh with said slow speed pinion; a hub fixed on said driven shaft; an overrunning device adapted to drivingly connect said gear and driven shaft through said hub to establish a slow speed ratio drive from said drive pinion; a centrifugal pawl clutch including as a member said hub and engageable to drivingly connect said drive pinion and driven shaft in direct drive at or above a predetermined speed of said drive pinion during slow speed ratio drive of said driven shaft, upon coast of said drive pinion; and shiftable means carried by said hub for releasing the direct drive between said drive pinion and driven shaft and re-establishing a slow speed ratio drive between said gear and driven shaft.

15. In a variable speed power transmission; a drive pinion; countershaft gears driven by said pinion including a slow speed pinion; a driven shaft; a gear journalled on said driven shaft in constant mesh with said slow speed pinion; a hub fixed on said driven shaft; an overrunning device adapted to drivingly connect said gear and driven shaft through said hub to establish a slow speed ratio drive from said drive pinion; a centrifugal pawl clutch including as a member said hub and engageable to drivingly connect said drive pinion and driven shaft in direct drive at or above a predetermined speed of said drive pinion during slow speed ratio drive of said driven shaft, upon coast of said drive pinion; and shiftable means carried by said hub operable to disengage said clutch for releasing the direct drive between said drive pinion and driven shaft and re-establishing a slow speed ratio drive.

16. In a variable speed power transmission; a drive pinion; countershaft gears driven by said pinion including a slow speed pinion; a driven shaft; a gear journalled on said driven shaft in constant mesh with said slow speed pinion; a hub non-rotatably fixed on said driven shaft; an overrunning device adapted to drivingly connect said gear and hub; a radially movable pawl rotatably driven by said drive pinion; a slotted pawl receiving shell rotatable with said hub; an axially shiftable sleeve on said hub; and pawl camming means on said sleeve.

17. In a variable speed power transmission; a drive pinion; countershaft gears driven by said pinion including a slow speed pinion; a driven shaft; a gear journalled on said driven shaft in constant mesh with said slow speed pinion; a set of clutch teeth on said gear; a hub member non-rotatably fixed on said driven shaft; an overruning device adapted to drivingly connect said gear and hub; a radially movable pawl rotatably driven by said drive pinion; a slotted pawl receiving shell rotatable with said hub and engageable by said pawl to establish a drive between said drive pinion and driven shaft; an axially shiftable sleeve non-rotatably carried on said hub; a set of clutch teeth on said sleeve engageable with said gear clutch teeth upon shifting movement of said sleeve and adapted thereby to establish a two-way drive between said gear and driven shaft around said overrunning device; and other means on said sleeve operable in said movement to disable said drive between said drive pinion and driven shaft.

18. In a variable speed power transmission; a drive pinion; countershaft gears driven by said pinion including a slow speed pinion; a driven shaft; a gear journalled on said driven shaft in constant mesh with said slow speed pinion; a set of clutch teeth on said gear; a hub member non-rotatably fixed on said driven shaft; an overruning device adapted to drivingly connect said gear and hub; a radially movable pawl rotatably driven by said drive pinion; a slotted pawl receiving shell rotatable with said hub and engageable by said pawl to establish a drive between said drive pinion and driven shaft; an axially shiftable sleeve non-rotatably carried on said hub; a set of clutch teeth on said sleeve engageable with said gear clutch teeth upon shifting movement of said sleeve and adapted thereby to establish a two-way drive between said gear and driven shaft around said overruning device; and cam means on said sleeve operable in said shifting movement to insure disengagement of said pawl from said shell.

19. In a variable speed power transmission; a drive pinion; countershaft gears driven by said pinion including a slow speed pinion; a driven shaft; a gear journalled on said driven shaft in constant mesh with said slow speed pinion; a set of clutch teeth rotatable with said gear; a hub member non-rotatably fixed on said driven shaft; a set of clutch teeth on said hub; an overrunning device adapted to drivingly connect said gear and hub member and comprising an inner element rotatable with said gear and an outer element rotatable with said hub; a set of clutch teeth on said outer element; an axially shiftable clutch sleeve non-rotatably carried on said hub member; a radially movable pawl rotatably driven by said drive pinion; a slotted pawl receiving shell rotatable with said hub, and engageable by said pawl to establish a direct drive between said drive pinion and driven shaft when said sleeve is in predetermined position; axially spaced sets of clutch teeth on said sleeve, one of said sets of teeth being engageable with the clutch teeth of said hub, the other set being selectively engageable with the clutch teeth of said gear and said outer element; the spacing of said sets of clutch teeth being such that when said other set of clutch teeth are engaged with said gear clutch teeth the said outer element is free of any engagement with either of said sets of teeth.

20. A variable speed power transmission as claimed in claim 19, including blocker synchronizer means journalled adjacent said gear clutch teeth and having means providing for limited oscillatory movement relative to said sleeve.

21. A variable speed power transmission as claimed in claim 19, including cam means on said clutch sleeve for disengaging said pawl incident to shift of said sleeve to engage said gear clutch teeth from a condition wherein said pawl is engaged with the shell.

22. In a variable speed power transmission including a drive shaft and a driven shaft; a centrifugal pawl clutch for establishing a direct drive between said shafts comprising a radially movable pawl rotatably driven by said drive shaft; a slotted pawl receiving shell drivingly connected with the driven shaft; an axially shiftable sleeve splined on said shell and an internal cam tooth carried by said sleeve adapted to disengage the pawl from the shell to disconnect said drive upon predetermined axial movement of said sleeve.

23. In a variable speed power transmission; a drive pinion, countershaft gearing driven by said pinion including a slow speed pinion; a driven shaft; a gear journaled on said driven shaft in constant mesh with said slow speed pinion; a hub fixed on said driven shaft; a centrifugal pawl clutch including as a member said hub and engageable to drivingly connect said drive pinion and driven shaft; shiftable means carried by said hub and drivingly engageable with said gear to drivingly connect said gear and driven shaft; means including an overrunning device adapted to drivingly connect said gear and driven shaft when said shiftable means is disengaged from said gear; and means on said shiftable means for disengaging said pawl to disconnect drive between said drive pinion and driven shaft and effect establishment of a drive between said gear and driven shaft.

24. In a variable speed power transmission; a drive shaft; a driven shaft; means including a centrifugal pawl type clutch operable when the pawl is engaged for establishing a relatively fast speed connection between said drive and driven shafts; means for diminishing torque on said clutch; means for establishing a relatively slow speed connection between said shafts including a gear train and interengageable elements one of which is also a shiftable element operable for releasing said pawl; said shiftable element being shiftable incident to a diminution of torque on said centrifugal clutch to release said pawl and thereby said fast speed drive connection and shiftable to engage said elements for establishing said relatively slow speed drive connection.

OTTO E. FISHBURN.

REFERENCES CITED

The following references are of record in the file of this patent:

UNITED STATES PATENTS

| Number | Name | Date |
|---|---|---|
| 2,048,435 | Dodge | July 21, 1936 |
| 2,056,365 | Rauen et al. | Oct. 6, 1936 |
| 2,128,485 | Keller | Aug. 30, 1938 |
| 2,256,960 | Neracher et al. | Sept. 23, 1941 |
| 2,319,496 | Fishburn | May 18, 1943 |
| 2,319,515 | Priebe | May 18, 1943 |
| 2,382,088 | Moffitt | Aug. 14, 1945 |